(12) United States Patent
Huang et al.

(10) Patent No.: US 9,999,106 B2
(45) Date of Patent: Jun. 12, 2018

(54) DIMMING CIRCUIT, CONTROL CIRCUIT AND DIMMING METHOD

(71) Applicant: Silergy Semiconductor Technology (Hangzhou) LTD, Hangzhou, ZheJiang Province (CN)

(72) Inventors: Qiukai Huang, Hangzhou (CN); Jian Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days. days.

(21) Appl. No.: 15/416,049

(22) Filed: Jan. 26, 2017

(65) Prior Publication Data

US 2017/0251535 A1  Aug. 31, 2017

(30) Foreign Application Priority Data

Feb. 26, 2016  (CN) .......................... 2016 1 0107388

(51) Int. Cl.
*H05B 33/08* (2006.01)
*H02M 3/335* (2006.01)
*H02M 3/155* (2006.01)
*H02M 1/00* (2006.01)

(52) U.S. Cl.
CPC ........ *H05B 33/0851* (2013.01); *H02M 3/155* (2013.01); *H02M 3/33507* (2013.01); *H05B 33/0815* (2013.01); *H02M 2001/007* (2013.01)

(58) Field of Classification Search
None
See application file for complete search history.

(56) References Cited

U.S. PATENT DOCUMENTS

| 5,585,713 A | 12/1996 | Crane et al. |
| 8,614,551 B2 | 12/2013 | Chen et al. |
| 8,890,425 B2 | 11/2014 | Zeng |
| 2010/0301766 A1* | 12/2010 | Zudrell-Koch .... H05B 33/0815 315/291 |
| 2015/0146461 A1 | 5/2015 | Deng et al. |
| 2016/0359420 A1* | 12/2016 | Chen ................ H02M 3/33523 |

* cited by examiner

*Primary Examiner* — Jany Richardson
(74) *Attorney, Agent, or Firm* — Michael C. Stephens, Jr.

(57) ABSTRACT

A dimming circuit for adjusting the brightness of an LED load, can include: a primary controlled flyback converter having a primary-side circuit, a first secondary-side circuit, and a second secondary-side circuit; a DC-DC converter coupled in a cascade arrangement with the second secondary-side circuit, where an output node of the DC-DC converter is coupled in series to an output node of the first secondary-side circuit; a control circuit configured to control, according to a dimming signal that represents an expected output current of the dimming circuit, a power switch of the primary controlled flyback converter to adjust output voltages of the first and second secondary-side circuits, to adjust a power that is provided to the LED load; and the control circuit being configured to control a power switch of the DC-DC converter according to the dimming signal, such that the DC-DC converter operates within a predetermined state range.

18 Claims, 7 Drawing Sheets

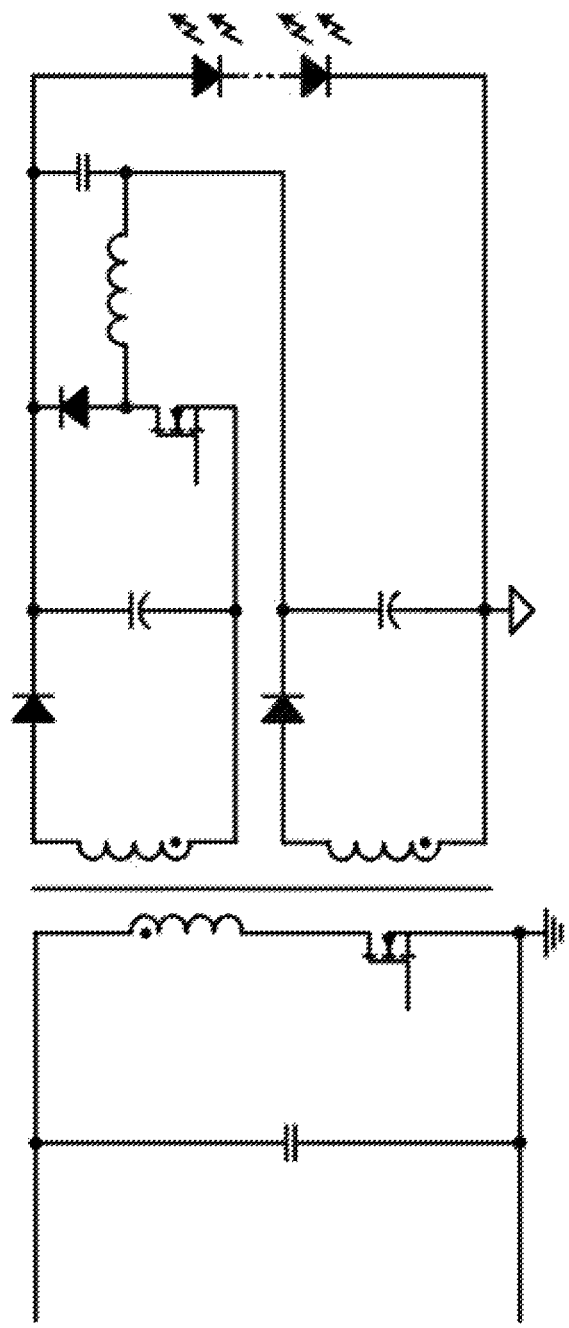
FIG. 1 (conventional)

DIMMING CIRCUIT, CONTROL CIRCUIT AND DIMMING METHOD

RELATED APPLICATIONS

This application claims the benefit of Chinese Patent Application No. 201610107388.4, filed on Feb. 26, 2016, which is incorporated herein by reference in its entirety.

FIELD OF THE INVENTION

The present invention generally relates to the field of power electronics, and more particularly to dimming circuits and methods.

BACKGROUND

With increasingly use of light-emitting diode (LED) lights, multi-stage switching converters are typically used in order to adjust the brightness of the light sources. In addition, each stage may deal with the power in total, which can increase product costs of the LED drivers. In order to reduce the costs, some conventional techniques divide the secondary winding at the output side of a flyback converter into two groups, and a DC-DC converter of the second stage may be connected to only one of the two groups.

BRIEF DESCRIPTION OF THE DRAWINGS

FIG. 1 is a schematic block diagram of a conventional dimming circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Referring now to FIG. 1, shown is a schematic block diagram of a conventional dimming circuit. In this example, the dimming circuit includes a DC-DC converter at the first stage for outputting a constant-voltage, and a DC-DC converter at the second-stage for providing an output current in response to a dimming signal. Cost and efficiency improvements may be with this approach, while reducing the voltage standing requirements of the devices when dimming. However, for such a dimming circuit, the DC-DC converter at the second stage may operate at a very low duty ratio when a driving current of a light-emitting diode (LED) light source needs to be adjusted to a low level, and this may lead to a decrease in efficiency.

In one embodiment, a dimming circuit for adjusting the brightness of an LED load, can include: (i) a primary controlled flyback converter having a primary-side circuit, a first secondary-side circuit, and a second secondary-side circuit; (ii) a DC-DC converter coupled in a cascade arrangement with the second secondary-side circuit, where an output node of the DC-DC converter is coupled in series to an output node of the first secondary-side circuit; (iii) a control circuit configured to control, according to a dimming signal that represents an expected output current of the dimming circuit, a power switch of the primary controlled flyback converter to adjust output voltages of the first and second secondary-side circuits, in order to adjust a power that is provided to the LED load; and (iv) the control circuit being configured to control a power switch of the DC-DC converter according to the dimming signal, such that the DC-DC converter operates within a predetermined state range.

Figure 2:
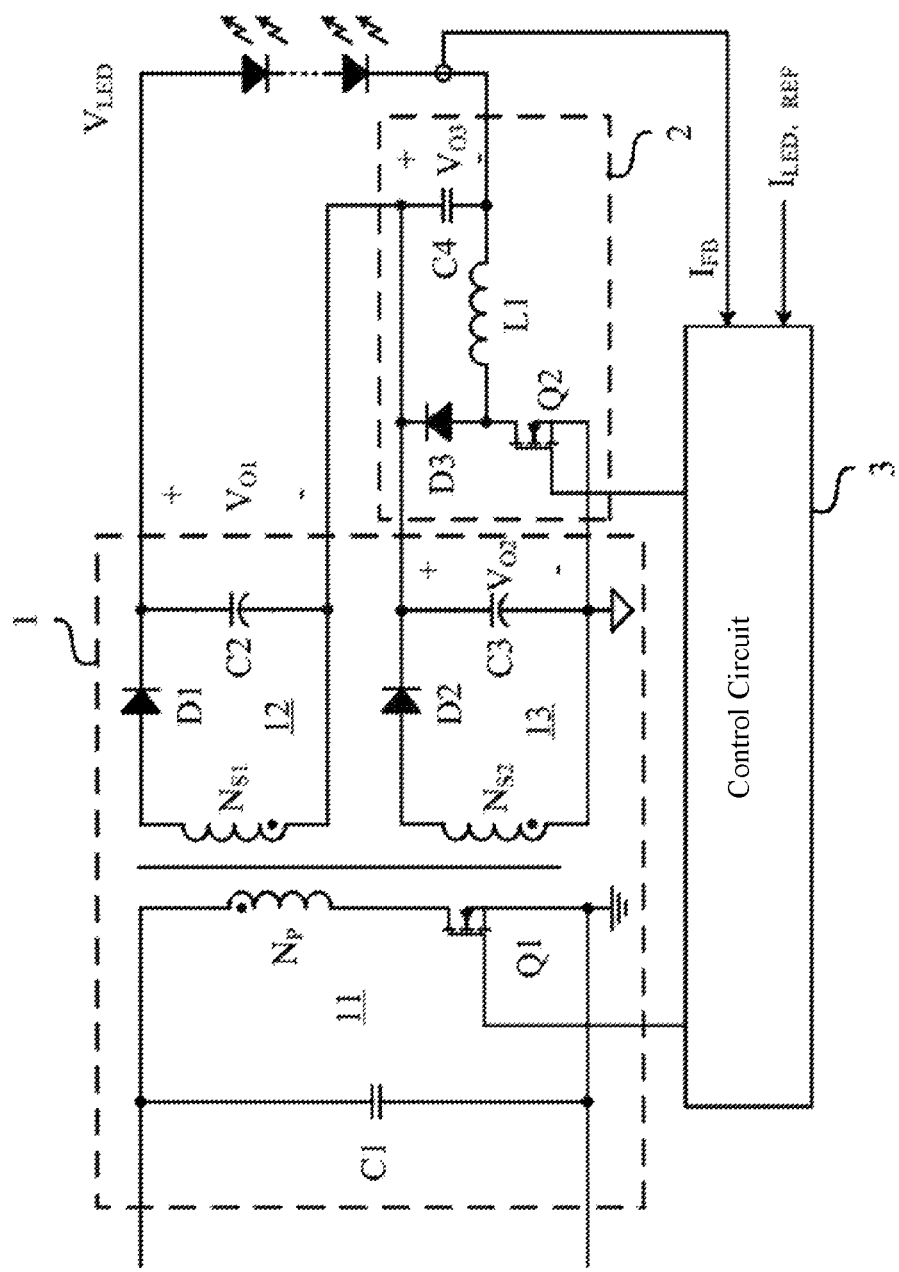
FIG. 2 is a schematic block diagram of a first example dimming circuit, in accordance with embodiments of the present invention.

Referring now to FIG. 2, shown is a schematic block diagram of a first example dimming circuit, in accordance with embodiments of the present invention. In this particular example, the dimming circuit can be coupled to an LED load for driving the LED load and dimming the brightness of the LED load according to a dimming signal. For example, the dimming signal may represent an expected output current of the dimming circuit. The dimming circuit can include primary controlled flyback converter 1, DC-DC converter 2, and control circuit 3. Primary controlled flyback converter 1 and DC-DC converter 2 may form a power stage of the LED driving circuit.

Primary controlled flyback converter 1 can include primary-side circuit 11, secondary-side circuit 12, and secondary-side circuit 13. Primary-side circuit 11 can include primary winding $N_P$, power switch Q1, and input filter capacitor C1. Secondary-side circuit 12 may have a first output node coupled to the LED load, and a second output node coupled to an output node of DC-DC converter 2. Secondary-side circuit 12 may have an output node coupled in series to an output node of DC-DC converter 2. The sum of the output voltages of secondary-side output circuit 12 and DC-DC converter 2 can be used to drive the LED load. Secondary-side circuit 13 can be coupled in a cascade arrangement with DC-DC converter 2. Also, the output node of secondary-side circuit 13 can be coupled to the input port of DC-DC converter 2.

Secondary-side circuit 12 can include secondary winding $N_{S1}$ and a first rectifier and filter circuit, which may include diode D1 and filter capacitor C2. Secondary-side circuit 13 may have substantially the same structure as secondary-side circuit 12. Secondary-side circuit 13 can include secondary winding $N_{S2}$ and a second rectifier and filter circuit that includes diode D2 and filter capacitor C3. Those skilled in the art will recognize that the first and second rectifier and filter circuits may also be implemented using other suitable circuit configurations, as well as other components having rectifying and filtering functions.

In certain embodiments, the power switch (e.g., a MOSFET) may be any electronic element that can be controlled to turn on and off. In addition, the number of turns of secondary winding $N_{S2}$ may be set/predetermined to be less than the number of turns of secondary winding $N_{S1}$ such that output voltage $V_{O2}$ of secondary circuit 13 is lower than output voltage $V_{O1}$ of secondary circuit 12. Thus, most of the power can be transferred directly through secondary circuit 12 to the LED load, thereby improving the overall efficiency of the system. In this way, an effective constant current control can be achieved for the output current by control circuit 3 while output voltage $V_{O2}$ of secondary circuit 13 is relatively low.

For example, DC-DC converter 2 may be a buck-type switching converter, or a switching converter of other topologies suitable for constant current control. DC-DC converter 2 can include rectifier diode D4, power switch Q2, inductor L1, and output filter capacitor C4. DC-DC converter 2 may also have a first output node coupled to an output node of secondary-side circuit 12, and a second output node coupled to the LED load. The second output node of DC-DC converter 2 can be coupled to the low voltage side of the LED load in this particular configuration.

Control circuit 3 may control power switch Q1 of primary controlled flyback converter 1, as well as power switch Q2 of DC-DC converter 2, according to dimming signal $I_{LED,REF}$, in order to adjust an output power (e.g., the power transmitted to the LED load) of the power stage. For example, control circuit 3 can control power switch Q1 such that primary controlled flyback converter 1 outputs a constant voltage corresponding to a reference voltage. In addition, control circuit 3 can control power switch Q2 to realize a constant current output, such that the dimming circuit can output a driving current corresponding to dimming signal $I_{LED,REF}$ to the LED load. In certain embodiments, control circuit 3 may adjust output voltage $V_{O2}$ of secondary-side circuit 12 and output voltage $V_{O3}$ of secondary-side circuit 13 by controlling power switch Q1 of primary-side circuit 11, such that DC-DC converter 2 operates in a predetermined state. Such a "predetermined state" can mean that the duty cycle or the predetermined duty cycle of DC-DC converter 2 is within a predetermined range.

Thus, control circuit 3 can control DC-DC converter 2 to operate in an optimum predetermined state. As described herein, the adjustment of the output voltage and the constant-voltage output control of primary controlled flyback converter 1 as mentioned above are not contradictory. Rather, the adjustment of the output voltage may be carried out according to the state or predetermined state changes of the DC-DC converter that is caused by the change of the dimming signal over a relatively long period, and the constant voltage output control may be carried out in order to enable the system to stably drive the LED load within a predetermined dimming state.

In this way, a "linkage" adjustment of a two-stage DC-DC converter can be achieved by adjusting the output voltage of the DC-DC converter at the first stage (e.g., the primary-side control flyback converter) according to the DC-DC converter at the second stage. Thus, the DC-DC converter at the second-stage can operate more efficiently in any dimming state, and the efficiency of the dimming circuit can thereby be improved. In addition, since the output voltage of the DC-DC converter at the first stage may be improved from fixed to adjustable, the output-side winding coupled to the DC-DC converter at the second stage may employ only a relatively small number of turns in order to realize the constant current adjustment. As a result, most of the power may be provided by the other winding; that is, most of the output power may be transformed by one stage, and the circuit may have a relatively high efficiency as a result. Further, since the input voltage of the DC-DC converter at the second stage may be relatively small, the device requirements can be relatively low, and the production costs of the dimming circuit can accordingly be reduced as compared to other approaches.

Figure 3:
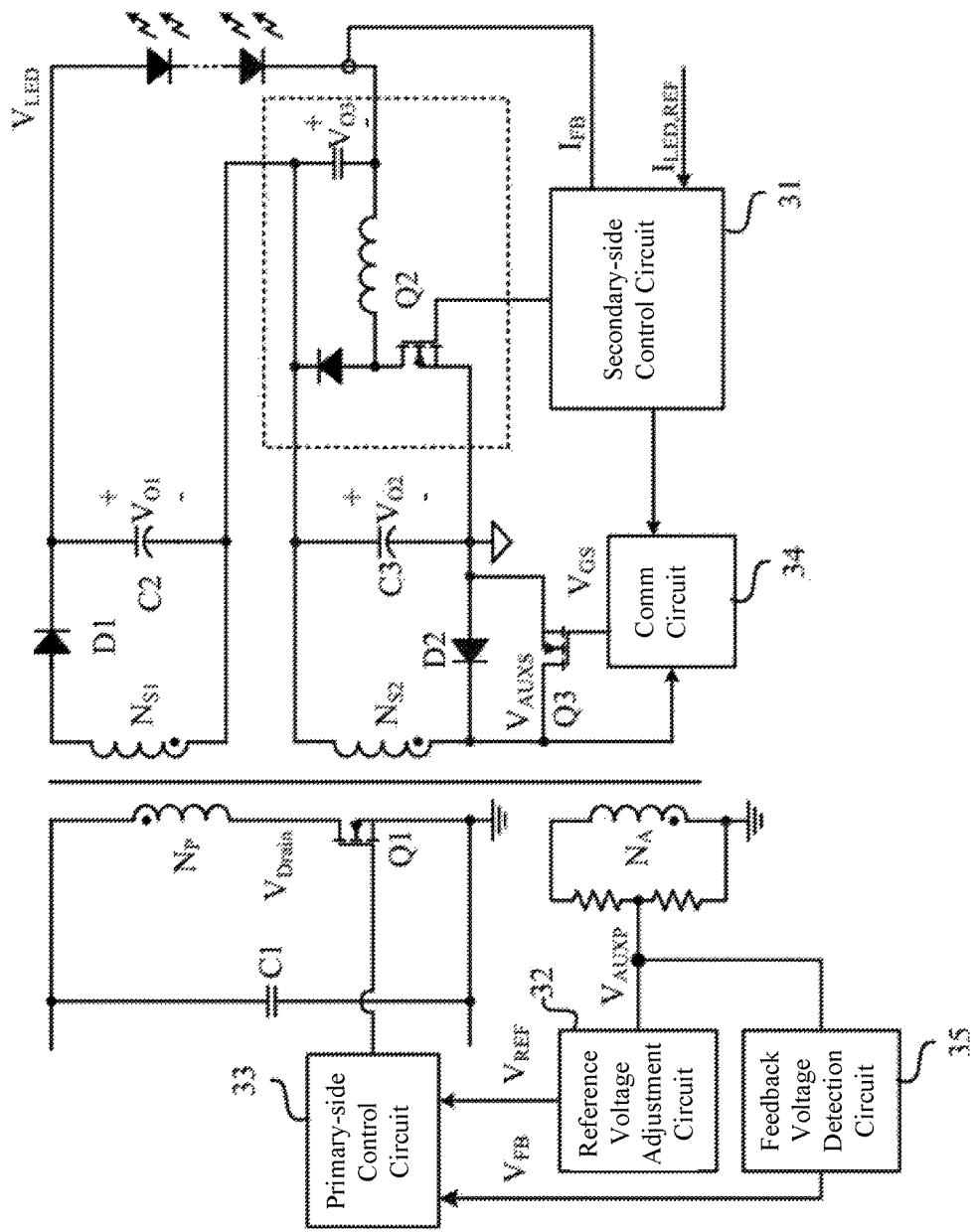
FIG. 3 is a schematic block diagram of a second example dimming circuit, in accordance embodiments of the present invention.

Referring now to FIG. 3, shown is a schematic block diagram of a second example dimming circuit, in accordance embodiments of the present invention. In this particular example, control circuit 3 can include secondary-side control circuit 31, reference voltage adjustment circuit 32, and primary-side control circuit 33. Secondary-side control circuit 31 can control power switch Q2 of DC-DC converter 2 based on dimming signal $I_{LED,REF}$, and may generate adjustment indication signal $V_{AD}$ based on information indicating the operating state or the expected operating state of the DC-DC converter.

Reference voltage adjustment circuit 32 can adjust reference voltage $V_{REF}$ of primary controlled flyback converter 1 in accordance with adjustment indication signal $V_{AD}$. For example, reference voltage $V_{REF}$ can represent the expected output voltage of the primary controlled flyback converter. Primary-side control circuit 33 can control power switch Q1 of primary controlled flyback converter 1 according to reference voltage $V_{REF}$, in order to realize a constant voltage output.

Secondary-side control circuit 31 can control reference voltage adjustment circuit 32 to lower reference voltage $V_{REF}$ when the information indicating the operating state or the expected operating state of the DC-DC converter indicates that the duty cycle of DC-DC converter 2 will be lower than (or already is lower than) a predetermined threshold value. Thus, the output voltage of the DC-DC converter at the first stage may be reduced, and the duty cycle of DC-DC converter 2 may be increased. In addition, secondary-side control circuit 31 can control reference voltage adjustment circuit 32 in order to increase reference voltage $V_{REF}$ when the information indicating the operating state or the expected operating state of the DC-DC converter indicates the duty cycle of DC-DC converter 2 will be higher than (or already is higher than) another predetermined threshold value. Thus, the output voltage of the DC-DC converter at the first stage may be increased, and the duty cycle of DC-DC converter 2 may be reduced. In this way, DC-DC converter 2 can remain operating within a reasonable predetermined range, such that the withstand voltage requirements for devices of DC-DC converter 2 may be reduced, and the associated production costs also reduced.

In particular, the information indicating the operating state or the expected operating state of the DC-DC converter may be either the dimming signal itself, or the duty cycle of the switching control signal currently output by secondary-side control circuit 31 for controlling power switch Q2 of DC-DC converter 2, or the difference between dimming signal $I_{LED,REF}$ and feedback signal IFB of the LED load current that is used to characterize the driving current flowing through the LED load. This information can represent the operating state or the expected operating state of the DC-DC converter.

When the information indicating the operating state or the expected operating state of the DC-DC converter is the dimming signal, the adjustment indication signal can be the reference voltage corresponding to the dimming signal. In this example, the open-loop control may be used to segment the dimming signal within its possible range, and to pre-define the reference voltage of the primary controlled flyback converter for the dimming signal in each range, in order to obtain the highest system efficiency. Secondary-side control circuit 31 can obtain a corresponding adjustment indication signal $V_{AD}$ according to dimming signal $I_{LED,REF}$. Adjustment indication signal $V_{AD}$ may indicate the reference voltage corresponding to the dimming signal. The primary-side may adjust the reference voltage according to adjustment indication signal $V_{AD}$ in order to achieve the highest system efficiency.

When the information indicating the operating state or the expected operating state of the DC-DC converter is the duty cycle of the power switch of the DC-DC converter, the adjustment indication signal can be used to indicate the direction in which the reference voltage adjustment is performed. Secondary-side control circuit 31 can generate adjustment indication signal $V_{AD}$ for increasing reference voltage $V_{REF}$ of primary controlled flyback converter 1 when the duty cycle of power switch Q2 of DC-DC converter 2 is greater than a first threshold value, and may generate adjustment indication signal $V_{AD}$ to lower reference voltage $V_{REF}$ of the primary controlled flyback converter 1 when the duty cycle is less than a second threshold value. For example, the first threshold value is greater than the second threshold value.

When the information indicating the operating state or the expected operating state of the DC-DC converter is the difference between dimming signal $I_{LED,REF}$ and the feedback signal of the LED load current, the secondary-side control circuit can generate adjustment indication signal $V_{AD}$ for increasing reference voltage $V_{REF}$ of primary controlled flyback converter 1 when the difference is greater than a third threshold value. The secondary-side control circuit can also generate adjustment indication signal $V_{AD}$ to lower reference voltage $V_{REF}$ of the primary controlled flyback converter when the difference is greater than a fourth threshold value.

Figure 4:
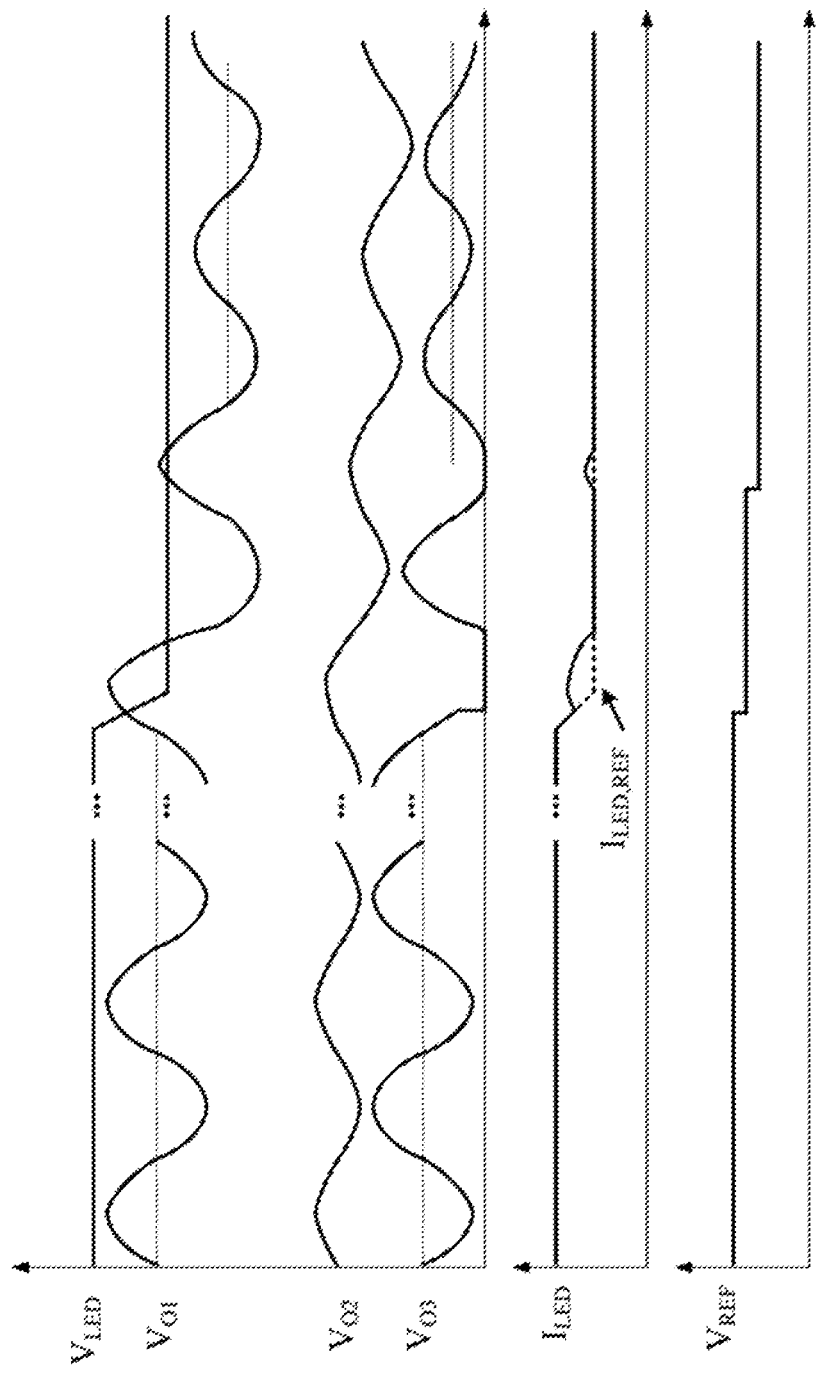
FIG. 4 is a waveform diagram of example operation of a dimming circuit, in accordance with embodiments of the present invention.

Referring now to FIG. 4, shown is a waveform diagram of example operation of a dimming circuit, in accordance with embodiments of the present invention. Here, $V_{LED}$ is the driving voltage of the LED load, which can equal the sum of output voltage $V_{O1}$ of secondary-side circuit 12 and output voltage $V_{O1}$ of DC-DC converter 2. For example, $I_{LED}$ can be the driving current of the LED load. In this example, when the reference current of the LED load (e.g., the dimming signal $I_{LED,REF}$) is lowered during dimming, the second stage converter (e.g., DC-DC converter 2) can control output voltage $V_{O3}$ to be lower. If the adjustment range is exceeded or the duty cycle is lower than a certain threshold value, output voltage $V_{O1}$ of secondary circuit 12 can be higher than the voltage required for the LED load, and secondary-side control circuit 31 may generate adjustment indication signal $V_{AD}$ to lower the reference voltage.

Reference voltage adjustment circuit 32 at the primary-side can be used to increase or decrease reference voltage $V_{REF}$ based on adjustment indication signal $V_{AD}$. The primary-side control circuit can control the primary-side switching control signal to control power switch Q1 in order to reduce output voltages $V_{O1}$ and $V_{O1}$ of the secondary-side circuit. In this way, output voltage $V_{O3}$ of DC-DC converter 2 can adjust the LED current to reach the reference value.

When the LED current increases, the process is similar, and if the duty cycle is too large, the second stage converter may lose the ability of adjustment. In this case, the value of reference voltage $V_{REF}$ can be increased and output voltage $V_{O3}$ of DC-DC converter 2 may be adjusted such that the driving current of the LED load reaches the desired value.

In addition, reference voltage adjustment circuit 32 may be configured at the primary side. As for a flyback converter, the signal may not be transmitted by directly coupling the primary side and the secondary side through conducting wires. Therefore, reference voltage adjustment circuit 32 may utilize a communication device either outside or inside control circuit 3, in order to obtain adjustment indication signal $V_{AD}$. For example, adjustment indication signal $V_{AD}$ can be an encoded digital signal. In the example of FIG. 3, the communication device is auxiliary winding $N_A$, which can be coupled to the primary winding, and to both second secondary windings, in order to sense the variation in the secondary current. The voltage across the auxiliary winding can be used to detect the feedback voltage and the zero-crossing point at the secondary side.

In FIG. 3, control circuit 3 can also include communication switch Q3 and communication circuit 34. Communication switch Q3 can be coupled in parallel to rectifier device D1 of secondary circuit 12, or rectifier device D2 of secondary circuit 13. Communication switch Q3 can be coupled in parallel with diode D2 such that diode D2 may effectively be shorted when communication switch Q3 is turned on. Communication circuit 34 can be coupled to secondary-side control circuit 31 for controlling communication switch Q3 to be turned on or to remain off according to adjustment indication signal $V_{AD}$ when the secondary-side current crosses zero. Reference voltage adjustment circuit 32 can also detect adjustment indication signal $V_{AD}$ by detecting the variation in the voltage across the auxiliary winding or the variation in the division voltage in at least two periods when the secondary-side current is crossing zero. For example, communication switch Q3 is a metal oxide semiconductor transistor (MOSFET). In order to prevent the source of communication switch Q3 from floating, one terminal of diode D2 may be grounded, thereby making the source of communication switch Q3 that is coupled in parallel with diode D2 also grounded, in order to increase system stability.

Figure 5:
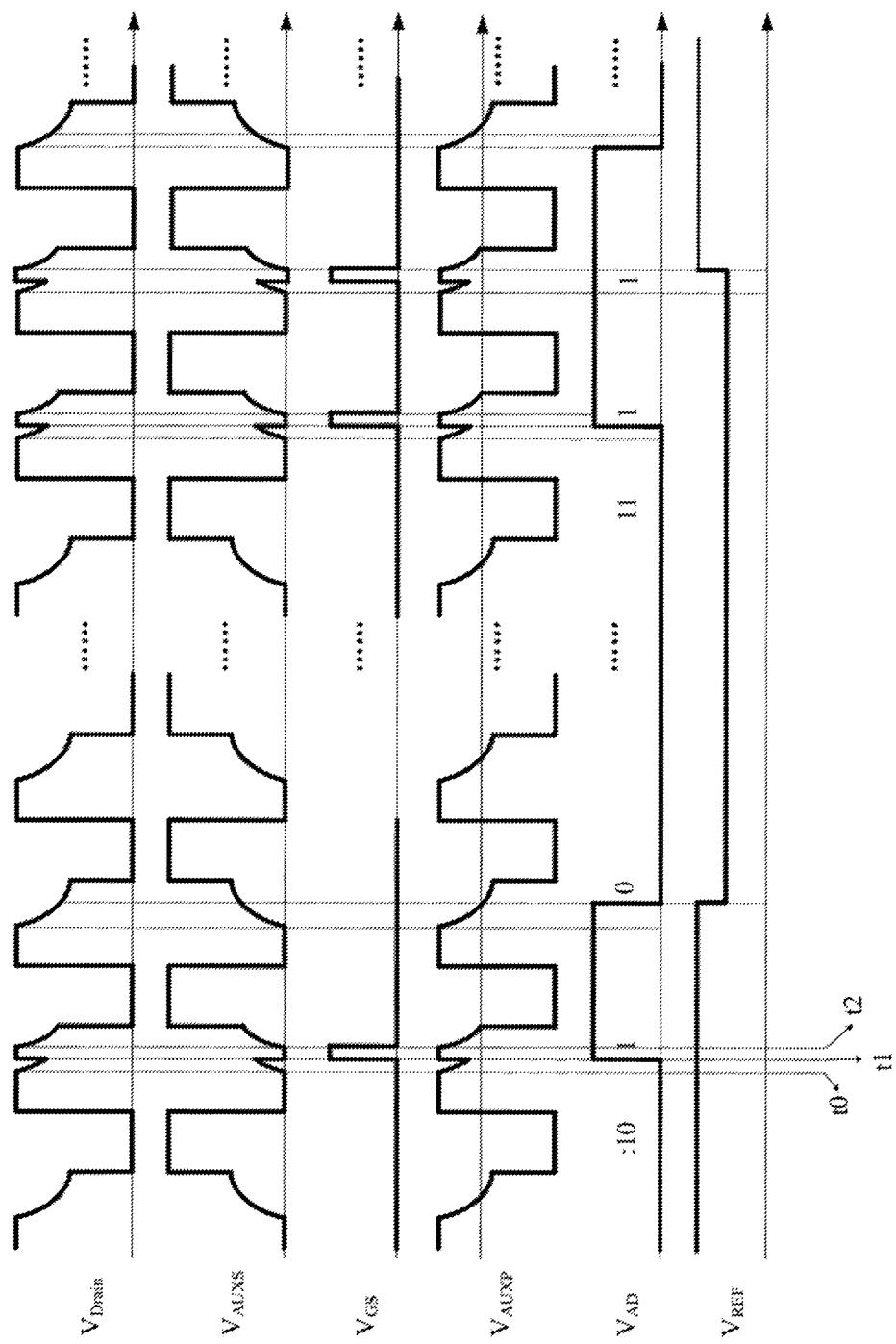
FIG. 5 is a waveform diagram of example operation of dimming circuit for communication via an auxiliary winding, in accordance with embodiments of the present invention.

Referring now to FIG. 5, shown is a waveform diagram of example operation of dimming circuit for communication via an auxiliary winding, in accordance with embodiments of the present invention. In this case, communication switch Q3 can remain off in a normal state, such that the second secondary-side circuit can operate normally. Control signal $V_{GS}$ of secondary-side circuit 13 is as shown in FIG. 5. At time t0, the currents of secondary windings $N_{S1}$ and $N_{S2}$ may cross zero, and the voltage across auxiliary winding $N_A$ may be consistent with the voltage across power switch Q1. Also, both voltages may suddenly drop while voltage $V_{AUXS}$ at the terminal of the secondary winding that is coupled to the rectifier device may begin to sharply rise. At the primary side, the zero-crossing signal can be detected not only by detecting the sudden drop during the time period from t0 to t1, but also by detecting the sudden rise of voltage $V_{AUXS}$.

At time t1, communication switch Q3 may be turned on at the secondary side until time t2. For example, a two-bit binary number may be used as the adjustment indication signal, and control switch Q3 can be controlled to turn on for a predetermined time period after the zero-crossing point of the current period, or after a predetermined time period from the zero-crossing point of the current cycle when the bit of the adjustment indication signal is 1, and may be controlled to remain off during the current period when the bit of the adjustment indication signal is 0. When communication switch Q3 is turned on, the excitation inductor and the parasitic capacitor of the transformer are oscillated, and the voltage across the auxiliary winding or division voltage $V_{AUXP}$ begins to decrease from the positive voltage to the negative voltage.

Communication switch Q3 can be turned on for a time period after crossing zero, and output filter capacitor C3 may excite the excitation inductor through secondary winding $N_{S2}$. The voltage drop of secondary winding $N_{S2}$ can be equal to output voltage $V_{O1}$ of the second secondary circuit. Because the voltage across auxiliary winding $N_A$ may suddenly rise, a relatively large dv/dt signal of the voltage signal may be detected, and the bit of the adjustment indication signal can be determined to be 1 based on the dv/dt signal, or the bit is 0. In this particular example, the adjustment of reference voltage $V_{REF}$ can be indicated as follows below in Table 1.

TABLE 1

| | $V_{AD}$ | | |
|---|---|---|---|
| | 11 | 10 | 0X |
| $V_{REF}$ | Increase | Decrease | Unchanged |

Reference voltage adjustment circuit 32 can continue to detect the next bit after detecting a bit with its value of 1, and may determine whether or not to adjust the reference voltage based on the detection results of two consecutive bits. If the bits are always detected as 0, the current reference voltage may remain unchanged. For example, reference voltage adjustment circuit 32 may increase or decrease reference voltage $V_{REF}$ by a predetermined adjustment value $\Delta V_{REF}$ each time when the adjustment is performed. Those skilled in the art will recognize more than two bits of coding may also be used as adjustment indication signals in order to prevent errors. In addition, when the adjustment indication signal indicates the reference voltage value corresponding to the dimming signal, the purpose of transmitting more information can be realized by a binary encoding with more digits.

Because reference voltage adjusting circuit 32 can detect the voltage of auxiliary winding $N_A$, the control circuit may set feedback voltage detection circuit 35 to obtain feedback voltage $V_{FB}$ of the output voltage of primary controlled flyback converter 1. Feedback voltage $V_{FB}$ can be obtained by detecting the voltage across auxiliary winding $N_A$. For example, reference voltage adjustment circuit 32 and feedback voltage detection circuit 35 may share the detection section circuit, thereby simplifying the overall circuit configuration.

Figure 6:
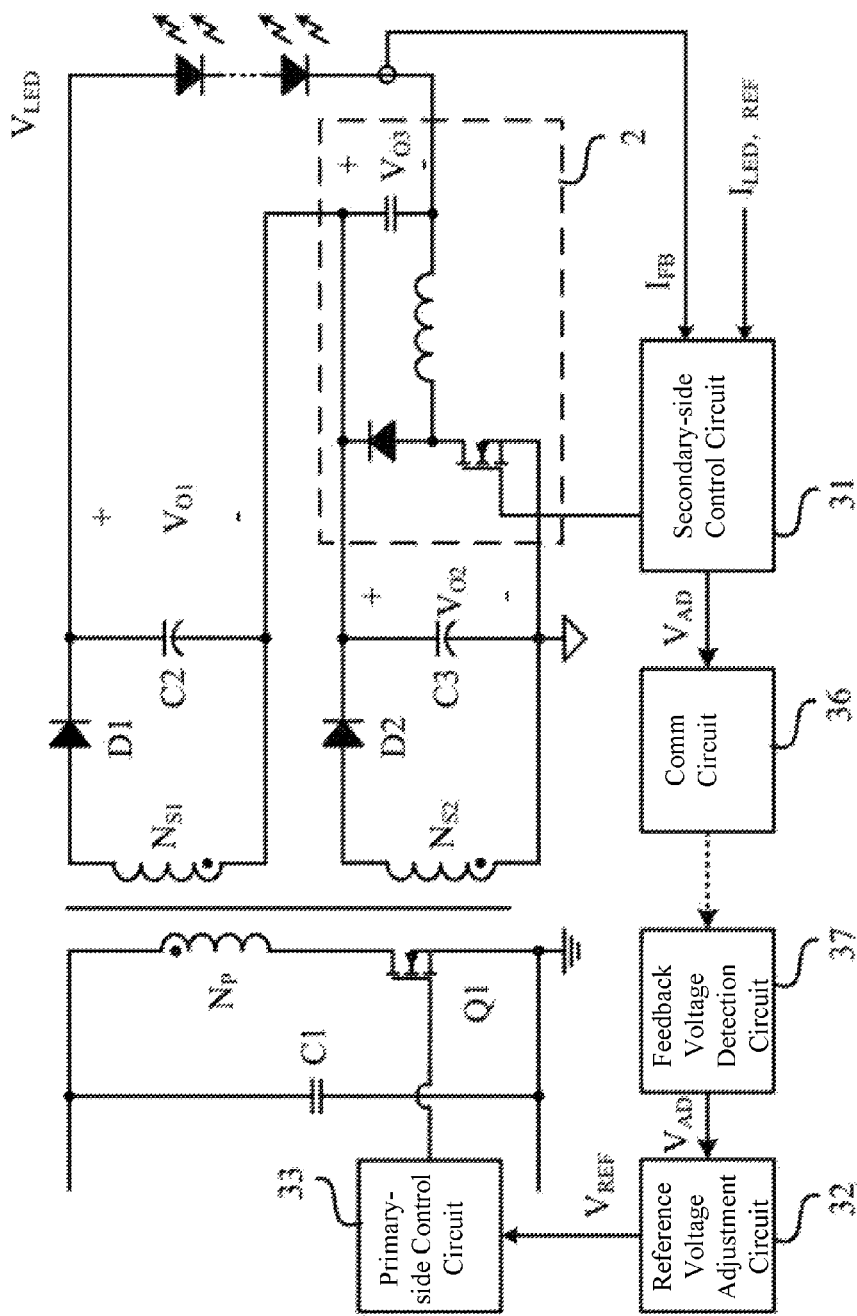
FIG. 6 is a schematic block diagram of a third example dimming circuit, in accordance with embodiments of the present invention.

Referring now to FIG. 6, shown is a schematic block diagram of a third example dimming circuit, in accordance with embodiments of the present invention. In certain embodiments, the adjustment indication signal may be transmitted from the secondary side to the primary side in other manners. In this particular example, control circuit 3 can include secondary-side communication device 36, and primary-side communication device 37 that may also be a part of control circuit 3. The two communication devices can transmit and receive the adjustment indication signal in a mutually isolated manner. Also, secondary-side communication device 36 and primary-side communication device 37 may be light-based isolated communication devices (e.g., opto-couplers, etc.), or radio based wireless communication devices (e.g., a Bluetooth, etc.).

In one embodiment, a method of adjusting the brightness of an LED load, can include: (i) controlling, by a control circuit, a power switch of a primary controlled flyback converter to adjust output voltages of first and second secondary-side circuits, in order to adjust a power that is provided to an LED load, where the controlling is according to a dimming signal that represents an expected output current of the dimming circuit; (ii) controlling, by the control circuit, a power switch of a DC-DC converter according to the dimming signal, such that the DC-DC converter operates within a predetermined state range, where the DC-DC converter is coupled in a cascade arrangement with the second secondary-side circuit, and where an output node of the DC-DC converter is coupled in series to an output node of the first secondary-side circuit; and (iii) adjusting, by a reference voltage adjustment circuit, a reference voltage of the primary controlled flyback converter according to the dimming signal, where the reference voltage represents an expected output voltage of the primary controlled flyback converter.

Figure 7:
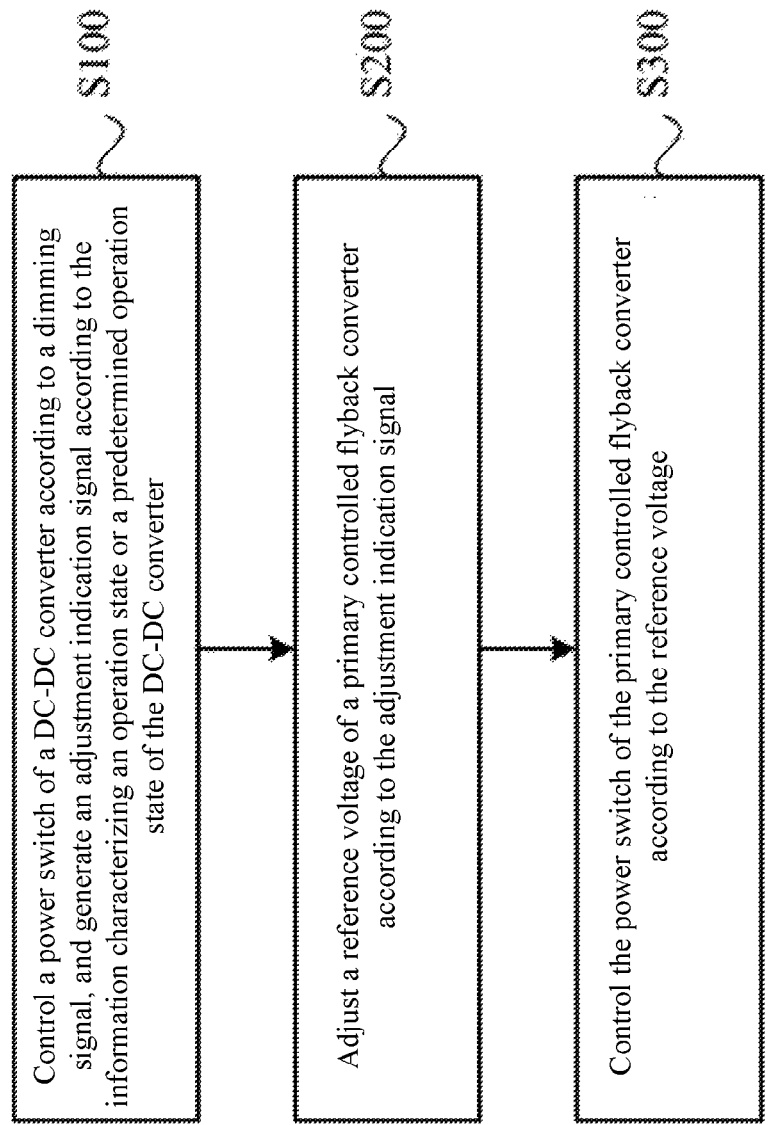
FIG. 7 is a flow diagram of an example method of controlling dimming, in accordance with embodiments of the present invention.

Referring now to FIG. 7, shown is a flow diagram of an example method of controlling dimming, in accordance with embodiments of the present invention. In certain embodiments, the dimming method can control the LED driving circuit that includes primary controlled flyback converter 1 and DC-DC converter 2, in order to perform dimming control. The dimming method can include controlling power switch Q1 of primary-side circuit 11 in order to adjust output voltage $V_{O1}$ of secondary-side circuit 12 and output voltage $V_{O1}$ of secondary-side circuit 13 such that the DC-DC converter operates within a predetermined state range (e.g., the duty cycle of the power switch of the DC-DC converter is within a predetermined range).

In particular embodiments, the method can include, at S100, controlling the power switch of the DC-DC converter in accordance with the dimming signal, and generating an adjustment indication signal based on information that indicates the operation state or the expected operation state of the DC-DC converter. The method can also include, at S200, adjusting the reference voltage of the primary controlled flyback converter according to the adjustment indication signal. The reference voltage can be used to characterize the expected output voltage of the primary controlled flyback converter. The method may also include, at S300, controlling the power switch of the primary controlled flyback converter according to the reference voltage.

In this way, a linkage adjustment of a two-stage DC-DC converter can be achieved by adjusting the output voltage of the DC-DC converter at the first stage (e.g., the primary-side control flyback converter) according to the DC-DC converter at the second stage, such that that the DC-DC converter at the second-stage operates more efficiently in any dimming states, and thereby improving the efficiency of the dimming circuit. In addition, since the output voltage of the DC-DC converter at the first stage can be improved from fixed to adjustable, the output-side winding coupled to the DC-DC converter at the second stage may need only a relatively small number of turns in order to realize the constant current adjustment. As a result, most of the power is provided by the other winding, that is, most of the output power may be transformed by one stage, and the circuit may have a relatively efficiency as compared to other approaches. Further, since the input voltage of the DC-DC converter at the second stage is relatively small, the device requirements can be relatively low, and the overall production costs of the dimming circuit may accordingly be reduced.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A dimming circuit for adjusting the brightness of an LED load, the dimming circuit comprising:
   a) a primary controlled flyback converter having a primary-side circuit, a first secondary-side circuit, and a second secondary-side circuit;
   b) a DC-DC converter coupled in a cascade arrangement with said second secondary-side circuit, wherein an output node of said DC-DC converter is coupled in series to an output node of said first secondary-side circuit;
   c) a control circuit configured to control, according to a dimming signal that represents an expected output current of said dimming circuit, a power switch of said primary controlled flyback converter to adjust output voltages of said first and second secondary-side circuits, in order to adjust a power that is provided to said LED load;
   d) a reference voltage adjustment circuit configured to adjust a reference voltage of said primary controlled flyback converter according to said dimming signal, wherein said reference voltage represents an expected output voltage of said primary controlled flyback converter; and
   e) said control circuit being configured to control a power switch of said DC-DC converter according to said dimming signal, such that said DC-DC converter operates within a predetermined state range.

2. The dimming circuit of claim 1, wherein said control circuit comprises:
   a) a secondary-side control circuit configured to control said power switch of said DC-DC converter according to said dimming signal, and to generate an adjustment indication signal according to information indicating an operation state or an expected operation state of said DC-DC converter; and
   b) a primary-side control circuit configured to control said power switch of said primary controlled flyback converter according to said reference voltage.

3. The dimming circuit of claim 2, wherein:
   a) said information indicating said operation state or said expected operation state of said DC-DC converter comprises said dimming signal; and
   b) said secondary-side control circuit is configured to obtain said adjustment indication signal by said dimming signal.

4. The dimming circuit of claim 2, wherein:
   a) said information indicating said operation state or said expected operation state of said DC-DC converter comprises a duty cycle of said power switch of said DC-DC converter; and
   b) said secondary-side control circuit is configured to generate said adjustment indication signal to increase said reference voltage of said primary controlled flyback converter when said duty cycle of said power switch of said DC-DC converter is greater than a first threshold value, and to lower said reference voltage of said primary controlled flyback converter when said duty cycle is greater than a second threshold value.

5. The dimming circuit of claim 2, wherein:
   a) said information indicating said operation state or said expected operation state of said DC-DC converter comprises a difference value between said dimming signal and a feedback signal of an LED driving current; and
   b) said secondary-side control circuit is configured to generate said adjustment indication signal to increase said reference voltage of said primary controlled flyback converter when said difference value between said dimming signal and said feedback signal of said LED driving current is greater than a third threshold value, and to lower said reference voltage of said primary controlled flyback converter when said difference value between said dimming signal and said feedback signal of said LED driving current is greater than a fourth threshold value.

6. The dimming circuit of claim 2, wherein said reference voltage adjustment circuit is configured to receive said adjustment indication signal through a primary-side communication device.

7. The dimming circuit of claim 6, wherein:
   a) said primary-side communication device comprises an auxiliary winding:
   b) said reference voltage adjustment circuit is configured to detect said adjustment indication signal by detecting variations in a voltage across said auxiliary winding or a division voltage in at least two periods near a zero-crossing point of a secondary-side current; and
   c) said control circuit comprises a communication switch coupled in parallel to a rectifier device of said first secondary-side circuit or a rectifier device of said second secondary-side circuit, and a communication circuit coupled to said secondary-side control circuit, and being configured to control said communication switch to turn on or remain off according to said adjustment indication signal near said zero-crossing point of said secondary-side current.

8. The dimming circuit of claim 7, wherein said control circuit further comprises a feedback voltage detection circuit configured to obtain a feedback voltage based on said voltage across said auxiliary winding or said division voltage, wherein said reference voltage adjustment circuit and said feedback voltage detection circuit share a detection circuit of said voltage across said auxiliary winding or said division voltage.

9. The dimming circuit of claim 6, wherein said control circuit further comprises a secondary-side communication device configured to transmit said adjustment indication signal to said primary-side communication device in an isolated manner.

10. A method of adjusting the brightness of an LED load, the method comprising:
    a) controlling, by a control circuit, a power switch of a primary controlled flyback converter to adjust output voltages of first and second secondary-side circuits, in order to adjust a power that is provided to an LED load, wherein said controlling is according to a dimming signal that represents an expected output current of said dimming circuit;
    b) controlling, by said control circuit, a power switch of a DC-DC converter according to said dimming signal, such that said DC-DC converter operates within a predetermined state range, wherein said DC-DC converter is coupled in a cascade arrangement with said second secondary-side circuit, and wherein an output node of said DC-DC converter is coupled in series to an output node of said first secondary-side circuit; and c) adjusting, by a reference voltage adjustment circuit, a reference voltage of said primary controlled flyback converter according to said dimming signal, wherein said reference voltage represents an expected output voltage of said primary controlled flyback converter.

11. The method of claim 10, further comprising:
a) controlling, by a secondary-side control circuit, said power switch of said DC-DC converter according to said dimming signal;
b) generating an adjustment indication signal according to information indicating an operation state or an expected operation state of said DC-DC converter; and
c) controlling, by a primary-side control circuit, said power switch of said primary controlled flyback converter according to said reference voltage.

12. The method of claim 11, wherein said information indicating said operation state or said expected operation state of said DC-DC converter comprises said dimming signal, and further comprising obtaining, by said secondary-side control circuit, said adjustment indication signal by said dimming signal.

13. The method of claim 11, wherein said information indicating said operation state or said expected operation state of said DC-DC converter comprises a duty cycle of said power switch of said DC-DC converter, the method further comprising:
a) generating, by said secondary-side control circuit, said adjustment indication signal to increase said reference voltage of said primary controlled flyback converter when said duty cycle of said power switch of said DC-DC converter is greater than a first threshold value; and
b) generating, by said secondary-side control circuit, said adjustment indication signal to lower said reference voltage of said primary controlled flyback converter when said duty cycle is greater than a second threshold value.

14. The method of claim 11, wherein said information indicating said operation state or said expected operation state of said DC-DC converter comprises a difference value between said dimming signal and a feedback signal of an LED driving current, the method further comprising:
a) generating, by said secondary-side control circuit, said adjustment indication signal to increase said reference voltage of said primary controlled flyback converter when said difference value between said dimming signal and said feedback signal of said LED driving current is greater than a third threshold value; and
b) generating, by said secondary-side control circuit, said adjustment indication signal to lower said reference voltage of said primary controlled flyback converter when said difference value between said dimming signal and said feedback signal of said LED driving current is greater than a fourth threshold value.

15. The method of claim 11, further comprising receiving, by said reference voltage adjustment circuit, said adjustment indication signal through a primary-side communication device.

16. The method of claim 15, wherein said primary-side communication device comprises an auxiliary winding, the method further comprising:
a) detecting, by said reference voltage adjustment circuit, said adjustment indication signal by detecting variations in a voltage across said auxiliary winding or a division voltage in at least two periods near a zero-crossing point of a secondary-side current; and
b) controlling a communication switch to turn on or remain off according to said adjustment indication signal near said zero-crossing point of said secondary-side current said control circuit.

17. The method of claim 16, further comprising obtaining, by a feedback voltage detection circuit, a feedback voltage based on said voltage across said auxiliary winding or said division voltage.

18. The method of claim 17, further comprising transmitting, by a secondary-side communication device, said adjustment indication signal to said primary-side communication device in an isolated manner.

* * * * *